US008819674B2

(12) United States Patent
Parikh et al.

(10) Patent No.: US 8,819,674 B2
(45) Date of Patent: Aug. 26, 2014

(54) ACCESS TO DATA FOR VIRTUAL DEVICES

(75) Inventors: Roopak Parikh, Milpitas, CA (US);
Kiran Joshi, San Jose, CA (US); Sirish Raghuram, San Jose, CA (US); Karthik Sreenivasa Murthy, Sunnyvale, CA (US); Vasani Soam Snehal, San Jose, CA (US)

(73) Assignee: WMware, Inc., Palo Alto, CA (US)

( * ) Notice: Subject to any disclaimer, the term of this patent is extended or adjusted under 35 U.S.C. 154(b) by 1584 days.

(21) Appl. No.: 12/195,763

(22) Filed: Aug. 21, 2008

(65) Prior Publication Data
US 2010/0050170 A1 Feb. 25, 2010

(51) Int. Cl.
G06F 9/455 (2006.01)

(52) U.S. Cl.
CPC .................................. *G06F 9/45537* (2013.01)
USPC ............................................................ 718/1

(58) Field of Classification Search
CPC ............................................ G06F 2009/45562
USPC ............................................................ 718/1
See application file for complete search history.

(56) References Cited

U.S. PATENT DOCUMENTS 5,581,724 A * 12/1996 Belsan et al. ................. 711/114
2008/0134178 A1 * 6/2008 Fitzgerald et al. ................ 718/1
2008/0256534 A1 * 10/2008 Chess et al. ...................... 718/1
2008/0307414 A1 * 12/2008 Alpern et al. .................... 718/1

OTHER PUBLICATIONS

Wikipedia, "File Allocation Table" entry. 27 pages, Jul. 27, 2008.*

* cited by examiner

*Primary Examiner* — Robert Fennema

(57) ABSTRACT

One embodiment of the present invention is a method for a virtual machine to access data from a virtual device, the method including: (a) attaching the virtual device to the virtual machine with a backing store that is a virtual image of a file system conforming to a predetermined file system format, wherein: (i) file system data is stored in one or more files, (ii) the virtual image includes metadata stored apart from the file system data, which metadata corresponds to the predetermined file system format, (iii) the metadata includes one or more directory records, and (iv) the one or more directory records include information that points directly or indirectly to the file system data; (b) issuing a read request for a block of data from the file system as if stored in the predetermined file system format; (c) accessing the metadata and determining the location of the requested block of data in the file system data; and (d) retrieving the requested block of data from the file system data.

20 Claims, 2 Drawing Sheets

ACCESS TO DATA FOR VIRTUAL DEVICES

FIELD OF THE INVENTION

One or more embodiments of the present invention relate to the field of computer software and, in particular, to methods for providing access to virtual devices.

BACKGROUND

The file system structure for optical disk storage devices generally conforms to the ISO 9660 standard defined by the International Standards Organization (ISO). This standard file system is recognized by most operating systems, and disks using it can be read by any conforming operating system. An ISO 9660 file system may exist on a physical CDROM drive, a physical DVDROM drive, or it may exist as an "ISO image" (an ISO image is an image, for example, a disk image, of an ISO 9660 file system) on local storage associated with a local computer or on storage remotely accessible over a network.

As is well known: (a) virtual machines (VMs), together with their "guest" operating systems and applications, run on a host computer using virtualization software such as ESX from VMWARE®, Inc.; (b) VMs can have "virtual" disk drives, and VMs can also have a virtual CDROM drive or a virtual DVDROM drive; (c) VMs can access ISO 9660 file systems; and (d) a virtual CDROM drive or a virtual DVDROM drive can be backed by: (i) a physical CDROM drive or a physical DVDROM drive, respectively, connected to the host computer, or (ii) an ISO image located either locally on the host computer or an ISO image that is remotely accessible over a network. Attaching a remotely accessible ISO image can be useful in that it provides access to a remotely accessible read-only file system without requiring a VM to have network connections enabled. In such a case, the remotely accessible ISO image is reached via Virtual Machine Extensions (VMX) in virtualization software and the host computer's network connection (VMX is a set of drivers in virtualization software that emulate the functionality of devices for a virtual machine). As a result, the remote file system appears to the VM to be a local file system, even if no network connections are enabled on the VM.

To create an ISO image from a set of files, all of them must be copied. This can be time consuming for sets of files using large amounts of data storage. This can be further problematic in applications where it is necessary to maintain more than one complete ISO image. For example, an ISO image may represent a set of files intended for downloading to many machines. New versions of the files may become available before all users have downloaded the previous versions. Thus, if an old ISO image is in use, the new files cannot be written to the old ISO image, and a new ISO image must be created using some old versions and the new versions. As a result, in addition to being time consuming, the creation of complete ISO images may require large amounts of data storage.

SUMMARY

One embodiment of the present invention is a method for a virtual machine to access data from a virtual device, the method including: (a) attaching the virtual device to the virtual machine with a backing store that is a virtual image of a file system conforming to a predetermined file system format, wherein: (i) file system data is stored in one or more files, (ii) the virtual image includes metadata stored apart from the file system data, which metadata corresponds to the predetermined file system format, (iii) the metadata includes one or more directory records, and (iv) the one or more directory records include information that points directly or indirectly to the file system data; (b) issuing a read request for a block of data from the file system as if stored in the predetermined file system format; (c) accessing the metadata and determining the location of the requested block of data in the file system data; and (d) retrieving the requested block of data from the file system data.

DETAILED DESCRIPTION

Figure 1:
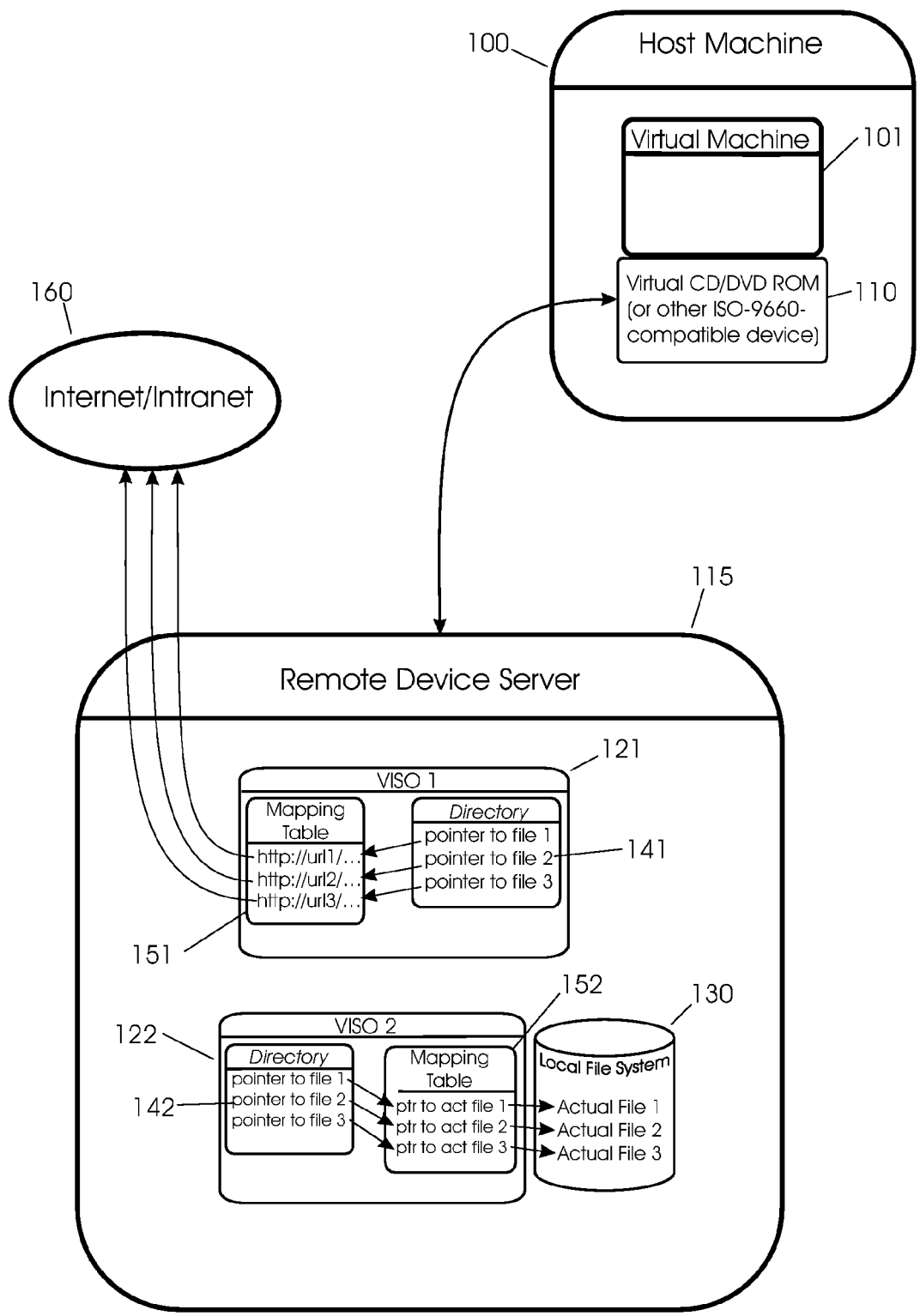
FIG. 1 shows a schematic diagram that helps illustrate an embodiment of the present invention that utilizes a virtual ISO 9660 file system (VISO) image.

Virtual Infrastructure (VI) is a collection of virtual machines (VMs) (as is well known in the art, a VM is a software abstraction, or "virtualization," of an actual physical computer system that runs on a virtualization layer—the virtualization layer is sometimes referred to in the art as virtualization software—and the VM has a "guest" operating system such as, for example and without limitation, WINDOWS®, LINUX, or OS-X) and applications that form at least part of an information technology infrastructure for, for example, an organization. As is well known, there is need for such applications from time to time to transfer data to a VM. It can be useful to accomplish this in some instances by attaching a remote image, for example and without limitation, an ISO image, to the VM (an ISO image is an image of an ISO 9660 file system). As is well known, a source file system for the ISO image may be an optical storage device such as a CDROM drive or a DVDROM drive; however, the source file system can be any file system conforming to the ISO 9660 standard which defines an arrangement of a file system on an optical disk drive. As is further well known, the ISO image can reside on any suitable data storage device such as a magnetic hard disk drive.

An ISO image is useful because an application can readily create an ISO image from data. In addition, and advantageously, using an ISO image does not require networking to be enabled for the VM since the VM could rely on the host computer's network. However, if the application data to be transferred is large, ISO image creation is time consuming, and duplication of data inside the ISO image consumes additional space.

The above-described advantages are retained and the above-described issues are overcome in accordance with one or more embodiments of the present invention. In accordance with one or more such embodiments, a virtual ISO (VISO) image is created that stores only metadata for an ISO 9660 file system rather than a complete ISO image. In particular, in accordance with one or more such embodiments of the present invention, the metadata are stored in reserved locations in a data structure defined by the ISO 9660 standard. When a virtual disk is backed by a VISO image in accordance with one or more embodiments of the present invention, it can be identified, for example and without limitation, with a ".viso" file extension—as is well known, ISO images are conventionally identified with an ".iso" file extension. In addition, and in accordance with one or more embodiments of the present invention, instead of copying application data files into the VISO image, software that creates the VISO image stores start offsets (i.e., file locations) and sizes of application data files.

In use, in accordance with one or more embodiments of the present invention, a VISO image is attached to a VM as an ISO image. However, when the ISO image is accessed for reading, a custom input/output (I/O) handler in virtualization software checks the read request, and services it with data obtained using the VISO image. In particular, a read request may be for metadata (such as, for example, file location and size, creation and change dates, access permissions, and the like), for file data content, or for both. Block boundaries for an ISO image are arbitrary in that a request can be made for a block with any sector offset and size. An ISO 9660 file system has a reserved area used to store metadata (folder/directory information), so typical requests will be for either metadata or file data, but it is nevertheless possible to make a request for a block that crosses the boundary between the metadata storage area and the file data storage area. The custom /I/O handler therefore checks for a request that includes data from both regions and divides the request into two blocks for processing.

FIG. 1 shows a schematic diagram that helps illustrate an embodiment of the present invention that utilizes a VISO image so that an effective ISO image can be generated without having to copy file data. As shown in FIG. 1, VM 101 is running on host machine 100 and virtual CD/DVD ROM 110 (or other ISO 9660 compatible device) is attached. In accordance with one or more embodiments of the present invention, and as will be described in detail below, VM 101 requires no modification to access a storage device via a VISO image. This means that VM 101 perceives CD/DVD ROM 110 (virtual device 110), as backed by a VISO image, to be an ISO 9660-formatted file system.

As further shown in FIG. 1, the data for virtual CD/DVD ROM 110 is remotely accessible from remote device server 115, and one or more ISO images are embodied as VISO images, 121 and 122, that link to file data stored, for example, on local file system 130 or on data storage accessible over network 160.

In accordance with one or more embodiments of the present invention, the VISO image contains only metadata for an ISO 9660 formatted file system. File data are stored outside the VISO; information that points directly or indirectly to the actual locations of the file data is stored inside the VISO. As shown in FIG. 1, the metadata comprise a set of volume descriptors. In accordance with one or more such embodiments, each volume descriptor comprises information (not shown) such as a disk label (i.e., an identifying name for the ISO 9660 formatted CD/DVD ROM device), a disk size, and, as shown in FIG. 1, a collection of directory records, 141 and 142, for VISO 121 and 122, respectively). In accordance with one or more such embodiments, each directory record, 141 or 142, corresponds to a folder or directory (the designations "folder" and "directory" are synonymous, one or the other being preferred by users of particular operating systems) or to a file of the ISO 9660 formatted disk image (only file examples are shown in FIG. 1). Each directory record, 141 or 142, includes attribute information of the folder/directory or file such as, for example, type, location, and size. In accordance with one or more such embodiments, for a folder or directory, each directory record includes sector offsets to a directory record in the VISO image for each file and subfolder in the folder or directory. And, in accordance with one or more such embodiments, for a file, each directory record includes a "sector offset" and size for the file, exactly as it would be found in an ISO 9660 file system or ISO disk image. However, since the actual file data do not exist in the VISO image, the file sector offset must point, directly or indirectly, to the actual file data. In accordance with one or more such embodiments, a mapping from "sector offset" to a path to the actual file data is stored separately in a mapping table (FIG. 1 shows mapping tables 151 for VISO 1 [121] and mapping table 152 for VISO 2 [122]). As such, and in accordance with one or more such embodiments, the mapping table, 151 or 152, maps sector offsets in the VISO image to paths to the actual file data for each file. While a path to actual file data may point to a location on an ISO 9660-formatted disk or an image of such a disk, in principle, the path can be to any location. For example, mapping table 152 in VISO 2 (122 in FIG. 1) points to locations on local file system 130. It could also point to a location (not shown) on any file system that is accessible to remote device server 115. As a further example, the mapping table 151 in VISO 1 (121 in FIG. 1) points to URLs for remote locations 160 which can be on a local intranet or anywhere on the internet. Two exemplary VISOs are shown in FIG. 1; however, any number of VISOs can be hosted on a single remote device server, and each VISO can use an arbitrary combination of sector mappings.

Figure 2:
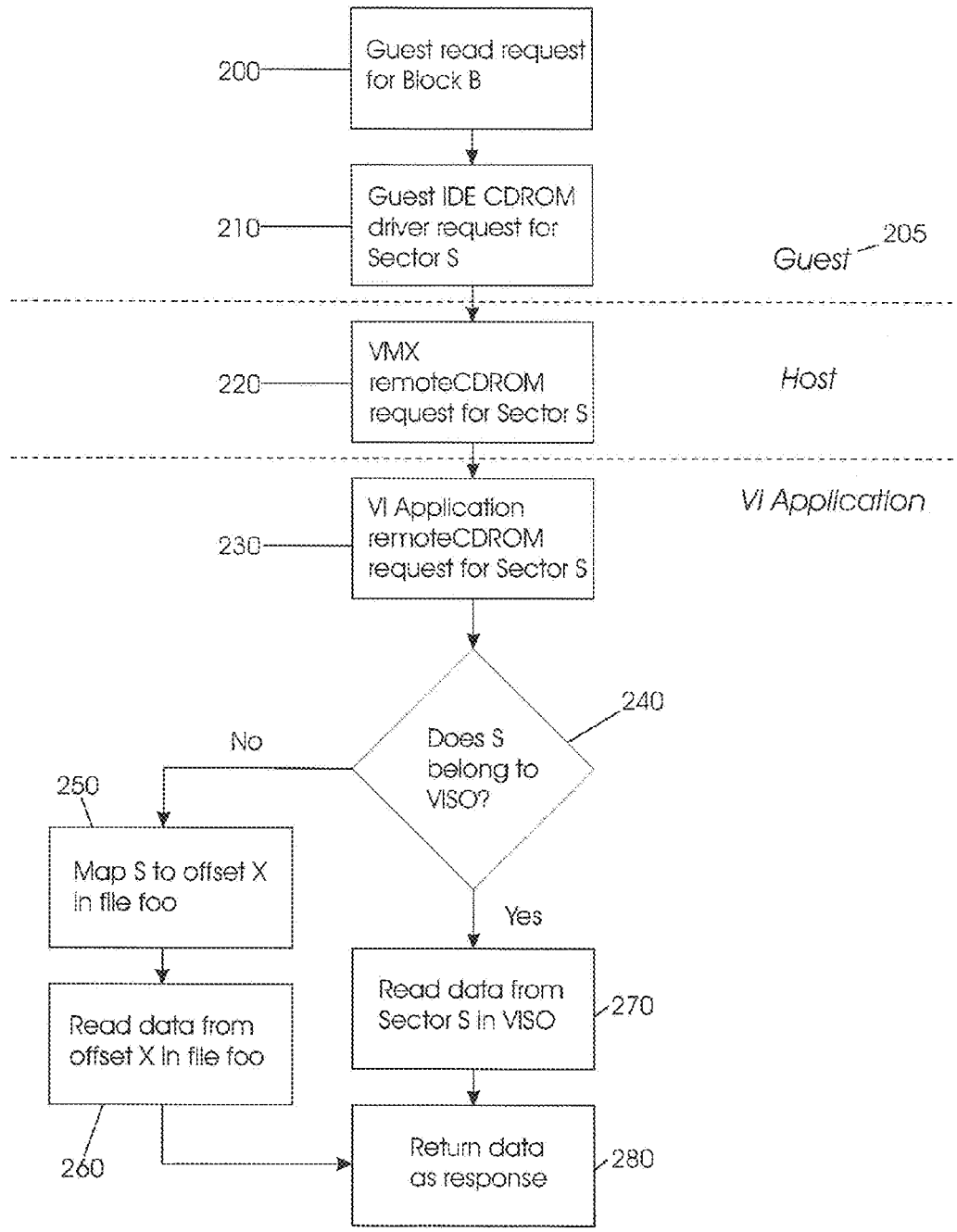
FIG. 2 shows a flowchart of a method for a VM reading from a virtual CDROM drive using a VISO in accordance with one or more embodiments of the present invention.

FIG. 2 shows a flowchart of a method for a VM to read from a virtual CDROM drive using a VISO image as a backing store for the virtual CDROM drive in place of a conventional ISO image in accordance with one or more embodiments of the present invention. In accordance with one or more such embodiments, a guest operating system of the VM requires no modification as it perceives the VISO image to be a standard ISO 9660 formatted file system image. An attachment application in virtualization software initially attaches the VISO image as the backing store for the virtual CDROM drive in accordance with any one of a number of methods that are well known to those of ordinary skill in the art.

At block 200 of FIG. 2, an application in a VM makes a block read request of the virtual CDROM device that is transmitted to guest operating system 205 of the VM. Next, control is transferred to block 210.

At block 210 of FIG. 2, a CDROM driver of guest operating system 205 translates the block read request into a CDROM sector read. Next, control is transferred to block 220.

At block 220 of FIG. 2, virtual machine extensions (VMX) of virtualization software of the host machine that handle I/O on behalf of the VM determine (for example, from stored system configuration information) that the read request is for data from a remotely accessible VISO image. Next, control is transferred to block 230.

At block 230 of FIG. 2, the read request is passed to a custom I/O handler in the virtualization software responsible for servicing read requests from the remotely accessible VISO image. Next, control is transferred to decision block 240.

At decision block 240 of FIG. 2, the custom I/O handler determines whether the request is for metadata in the VISO image or for file data or for both. In accordance with one or more embodiments of the present invention, the metadata are stored in reserved locations in a data structure defined by the ISO 9660 standard. Because of this, the request type can be determined by analyzing the location from which to read. As such, in accordance with one or more embodiments of the present invention, the sector offset and size of the read request indicate whether the request is for metadata in the VISO image or for file data or for both. If the read request is for file data, control is transferred to block 250; if the read request is for metadata, control is transferred to block 270; and if the request is for both, the read request is separated into metadata and file data requests, and control is transferred to both blocks 250 and 270.

At block 250 of FIG. 2, directory records in the VISO image are searched for the corresponding sector offset to identify a file, a path to the file, and an offset within the file from which to read the actual data. In accordance with one or more embodiments, the search may entail searching a mapping table (described above in conjunction with FIG. 1). Next, control is transferred to block 260.

At block 260 of FIG. 2, depending on the sector(s) requested by the read request, portions of one or more files are read from the appropriate offset(s). Next, control is transferred to block 280.

At block 270 of FIG. 2, data is read from the VISO image.

At block 280, the data provided in either block 260 or 270 or both are concatenated into a read buffer, and the buffer contents are returned to the guest operating system as the response.

Note that the above-described read process is block- and sector-oriented, and the associated file identity remains under the control of the guest operating system. Thus, the custom I/O handler does not need to know anything about the file system structure, but merely returns the requested blocks of data. It is able to determine from the sector offset and size alone whether to return data from the VISO image itself, a mapped location outside the VISO image, or both.

While ISO 9660 file systems are commonly used for read-only data storage devices, they can also be used for storage devices that permit changes in the form of additions and deletions of files. Examples include file systems on CD-RW and DVD-RW devices and drives which are set up to be read-only for most users, except for selected system administrators. When using a VISO image, one can "hot add" or "hot delete" a file or files. To hot add a file, it is only necessary to add a directory entry for the new file, and an entry into the mapping table, if used. To hot delete a file, it is only necessary to delete a directory entry. Then, the next time any VM requests data that are managed by the VISO image (either accessing the VISO image for the first time or a subsequent time), the changed information is available. Note that permission to add or delete files is typically provided only to certain users (system administrators) with write or delete access to a file system. Permission to hot add and hot delete files in a VISO image can be restricted to particular users who also have write and delete access to the underlying file system. Users who only access data on the file system through the VISO image could still see a read-only device, and would not be able to add or delete files. The necessary permissions may be managed by the attachment application.

In accordance with one or more embodiments of the present invention, a VISO can be created by virtualization software or any other application running on any machine that has write access to a storage location for the VISO. As one of ordinary skill in the art can readily appreciate, a method for providing a virtual image of a file system conforming to a predetermined file system format wherein file system data is stored in one or more files (for example and without limitation, a VISO) comprises creating metadata corresponding to the predetermined file system format wherein: (a) the metadata includes one or more directory records; and (b) the one or more directory records comprise information that points directly or indirectly to the file system data. VISOs can be shared for read-access by multiple VMs, and the virtualization software can establish virtual devices for each VM to connect to the VISO. Each guest operating system is unable to tell that the virtual device is a shared resource.

Unless specifically stated otherwise above, discussions utilizing terms such as, for example and without limitation, "accessing," "scanning," "determining," "applying," "generating," "utilizing," "storing," "causing," "coupling," "employing," "performing," "providing," "interfacing," "detecting," "creating," "coordinating," "scheduling," and "updating," or the like, refer to the actions and processes of a computer system, or similar electronic computing devices. The computer system or similar electronic computing device manipulates and transforms data represented as physical (electronic) quantities within the computer system's registers and memories into other data similarly represented as physical quantities within the computer system memories or registers or other such information storage, transmission, or display devices.

It will be understood that the descriptions of one or more embodiments of the present invention do not limit the various alternative, modified and equivalent embodiments which may be included within the spirit and scope of the present invention as defined by the appended claims. For example, although embodiments were described in regard to the ISO 9660 standard, further embodiments may be created using a predetermined file system format. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A method for a virtual machine to access data from a virtual device, the method comprising:
    attaching the virtual device to the virtual machine, wherein the virtual device is backed by an image comprising file system metadata stored in accordance with a structure of a file system supported by the virtual device and data for files indicated by the file system metadata as being stored at sector offsets in the image are stored separate from the image, and wherein the image stores a mapping table including mappings from sector offsets in the image to locations storing data for files stored separately from the image;
    receiving a read request for a block of data corresponding to one of the files from the virtual device;
    accessing a file system record associated with the read request in a directory located in the image, wherein file system metadata in the file system record includes a sector offset in the image for the file corresponding to the block of data, and wherein the sector offset is a first location in the image;
    accessing the mapping table to map the sector offset to a second location storing the file for the block of data that is separate from the image; and
    retrieving the requested block of data from the second location.

2. The method of claim 1 wherein:
    the image is remotely accessible to the virtual machine.

3. The method of claim 1 wherein the image is stored remotely from the data.

4. The method of claim 1 wherein the file system is based on an International Standards Organization (ISO) 9660 standard.

5. The method of claim 1 wherein file system records in the image include sector offsets and sizes for each file as it would be found in the file system.

6. The method of claim 1 wherein the reference is a uniform resource locator (URL).

7. The method of claim 1 wherein the directory record conforms to the structure of the file system.

8. The method of claim 1 wherein the reference is placed in a section offset field of the directory record.

9. A non-transitory computer-readable storage medium containing instructions for a virtual machine to access data from a virtual device, the instructions for controlling a computer system to be operable to:
    attach the virtual device to the virtual machine, wherein the virtual device is backed by an image comprising file system metadata stored in accordance with a structure of a file system supported by the virtual device and data for files indicated by the file system metadata as being stored at sector offsets in the image are stored separate from the image, and wherein the image stores a mapping table including mappings from sector offsets in the image to locations storing data for files stored separately from the image;
    receive a read request for a block of data corresponding to one of the files from the virtual device;
    access a file system record associated with the read request in a directory located in the image, wherein file system metadata in the file system record includes a sector offset in the image for the file corresponding to the block of data, and wherein the sector offset is a first location in the image;
    access the mapping table to map the sector offset to a second location storing the file for the block of data that is separate from the image; and
    retrieve the requested block of data from the second location.

10. The non-transitory computer-readable storage medium of claim 9 wherein:
    the image is remotely accessible to the virtual machine.

11. The non-transitory computer-readable storage medium of claim 9 wherein the image is stored remotely from the data.

12. The non-transitory computer-readable storage medium of claim 9 wherein the file system is based on an International Standards Organization (ISO) 9660 standard.

13. The non-transitory computer-readable storage medium of claim 9 wherein file system records in the image include sector offsets and sizes for each file as it would be found in the file system.

14. The non-transitory computer-readable storage medium of claim 13 wherein the reference is a uniform resource locator (URL).

15. An apparatus comprising:
    one or more computer processors; and
    a computer-readable storage medium comprising instructions for a virtual machine to access data from a virtual device, the instructions for controlling the one or more computer processors to be operable to:
    attach the virtual device to the virtual machine, wherein the virtual device is backed by an image comprising file system metadata stored in accordance with a structure of a file system supported by the virtual device and data for files indicated by the file system metadata as being stored at sector offsets in the image are stored separate from the image, and wherein the image stores a mapping table including mappings from sector offsets in the image to locations storing data for files stored separately from the image;
    receive a read request for a block of data corresponding to one of the files from the virtual device;
    access a file system record associated with the read request in a directory located in the image, wherein file system metadata in the file system record includes a sector offset in the image for the file corresponding to the block of data, and wherein the sector offset is a first location in the image;
    access the mapping table to map the sector offset to a second location storing the file for the block of data that is separate from the image; and
    retrieve the requested block of data from the second location.

16. The apparatus of claim 15 wherein:
    the image is remotely accessible to the virtual machine.

17. The apparatus of claim 15 wherein the image is stored remotely from the file system data.

18. The apparatus of claim 15 wherein the file system is an International Standards Organization (ISO) 9660 standard.

19. The apparatus of claim 15 wherein file system records in the image include sector offsets and sizes for each file as it would be found in the file system.

20. A method for a virtual machine to access data from a virtual device, the method comprising:
    attaching the virtual device to the virtual machine, wherein the virtual device is backed by an image comprising file system metadata stored in accordance with a structure of a file system supported by the virtual device and data for files indicated by the file system metadata as being stored in the image are stored separate from the image;
    receiving a read request for a block of data corresponding to one of the files from the virtual device;
    accessing a file system record associated with the read request in a directory located in the image, wherein file system metadata in the file system record includes a sector offset in the image for the file corresponding to the block of data, and wherein the sector offset is a first location in the image;
    using the sector offset to determine a second location separate from the image where the file corresponding to the requested block of data is stored; and
    retrieving the requested block of data from the second location.

* * * * *